United States Patent
Akamine et al.

(10) Patent No.: US 11,210,953 B2
(45) Date of Patent: Dec. 28, 2021

(54) DRIVING SUPPORT DEVICE

(71) Applicant: DENSO CORPORATION, Kariya (JP)

(72) Inventors: Yusuke Akamine, Nisshin (JP); Yasuyuki Miyake, Kariya (JP)

(73) Assignee: DENSO CORPORATION, Kariya (JP)

(*) Notice: Subject to any disclaimer, the term of this patent is extended or adjusted under 35 U.S.C. 154(b) by 224 days.

(21) Appl. No.: 16/440,141

(22) Filed: Jun. 13, 2019

(65) Prior Publication Data
US 2019/0295418 A1 Sep. 26, 2019

Related U.S. Application Data

(63) Continuation of application No. PCT/JP2017/042899, filed on Nov. 29, 2017.

(30) Foreign Application Priority Data

Dec. 15, 2016 (JP) .............................. JP2016-243203

(51) Int. Cl.
*G08G 1/16* (2006.01)
*B60Q 9/00* (2006.01)
*G08G 1/01* (2006.01)
*G08G 1/052* (2006.01)

(52) U.S. Cl.
CPC .............. *G08G 1/166* (2013.01); *B60Q 9/008* (2013.01); *G08G 1/0125* (2013.01); *G08G 1/052* (2013.01); *G08G 1/16* (2013.01); *G08G 1/163* (2013.01); *G08G 1/167* (2013.01)

(58) Field of Classification Search
CPC ........ G08G 1/166; G08G 1/16; G08G 1/0125; G08G 1/052; G08G 1/163; G08G 1/167; B60Q 9/08
See application file for complete search history.

(56) References Cited

U.S. PATENT DOCUMENTS

| 9,701,307 B1* | 7/2017 | Newman ............. B60W 10/184 |
| 2003/0187578 A1* | 10/2003 | Nishira .................. G08G 1/167 |
| | | 701/301 |

(Continued)

FOREIGN PATENT DOCUMENTS

| JP | 2003-232853 A | 8/2003 |
| JP | 2010-079565 A | 4/2010 |

(Continued)

*Primary Examiner* — Ojiako K Nwugo
(74) *Attorney, Agent, or Firm* — Maschoff Brennan (57) ABSTRACT

A driving support device of the present disclosure includes an other vehicle detecting unit, a lane recognizing unit, a track acquiring unit, an interference determining unit, and a driving support unit. The other vehicle detecting unit is configured to detect a location of another vehicle existing around the own vehicle. The lane recognizing unit is configured to recognize a traffic lane in which the other vehicle is located. The track acquiring unit is configured to acquire an own vehicle track. The interference determining unit is configured to determine whether an other vehicle course interferes with the own vehicle track. The driving support unit is configured to perform driving support different between in an interference state indicating a case where the other vehicle course interferes with the own vehicle track and in a non-interference state.

5 Claims, 4 Drawing Sheets (56) References Cited

U.S. PATENT DOCUMENTS

| | | | |
|---|---|---|---|
| 2007/0013495 A1* | 1/2007 | Suzuki | G09G 5/026 340/435 |
| 2009/0024357 A1* | 1/2009 | Aso | G08G 1/161 702/181 |
| 2009/0118994 A1* | 5/2009 | Mori | G06K 9/00798 701/117 |
| 2010/0169013 A1* | 7/2010 | Nakamura | G08G 1/0969 701/469 |
| 2015/0035687 A1* | 2/2015 | Bowers | G08G 1/166 340/933 |
| 2015/0130600 A1* | 5/2015 | Huang | G08G 1/166 340/438 |
| 2015/0166062 A1* | 6/2015 | Johnson | B60W 10/20 701/41 |
| 2015/0278610 A1* | 10/2015 | Renner | G06K 9/209 340/435 |
| 2016/0264108 A1* | 9/2016 | Harada | B60T 7/22 |
| 2017/0015354 A1* | 1/2017 | Nilsson | B62D 15/0255 |
| 2017/0017848 A1* | 1/2017 | Gupta | B60W 30/06 |
| 2017/0039865 A1* | 2/2017 | Takabayashi | G08G 1/167 |
| 2017/0072951 A1* | 3/2017 | Sakaguchi | B60W 30/143 |
| 2017/0166204 A1* | 6/2017 | Yoo | B62D 15/0265 |
| 2018/0061237 A1* | 3/2018 | Erickson | G08G 1/0129 |
| 2019/0101916 A1* | 4/2019 | Sen | G06K 9/00845 |
| 2019/0279507 A1* | 9/2019 | Ishisaka | B60Q 9/00 |
| 2019/0283777 A1* | 9/2019 | Mimura | B62D 15/025 |

FOREIGN PATENT DOCUMENTS

| | | |
|---|---|---|
| JP | 2010-259021 A | 11/2010 |
| JP | 2011-164760 A | 8/2011 |
| JP | 2012-226624 A | 11/2012 |

\* cited by examiner

DRIVING SUPPORT DEVICE

CROSS-REFERENCE TO RELATED APPLICATION

This application is a U.S. application under 35 U.S.C. 111(a) that claims the benefit under 35 U.S.C. 120 from International Application No. PCT/JP2017/042899 filed on Nov. 29, 2017, the entire contents of which are incorporated herein by reference. The present international application also claims the benefit of priority from Japanese Patent Application No. 2016-243203 filed with Japan Patent Office on Dec. 15, 2016, the entire contents of which are incorporated herein by reference.

BACKGROUND

Technical Field

The present disclosure relates to a driving support device.

Background Art

A technique in which an own vehicle acquires information of a traffic lane of another vehicle, which is detected by the other vehicle, through communication, and estimates a moving direction of the other vehicle is known.

SUMMARY

A driving support device according to one aspect of the present disclosure includes an other vehicle detecting unit, a lane recognizing unit, a track acquiring unit, an interference determining unit.

The other vehicle detecting unit is configured to detect a location of another vehicle located around the own vehicle. The lane recognizing unit is configured to recognize a traffic lane in which the other vehicle is located. The track acquiring unit is configured to acquire an own vehicle track.

The interference determining unit is configured to determine whether an other vehicle course interferes with the own vehicle track.

DETAILED DESCRIPTION OF THE PREFERRED EMBODIMENTS

The inventor of the present disclosure has studied a driving support device which can estimate a moving direction of another vehicle regardless of a communication state.

As a result of detailed study by the inventors, it was found that, with the known technique, since the information of the traffic lane of the other vehicle is acquired by the own vehicle through communication, there is a problem that the moving direction of the other vehicle cannot be estimated depending on a communication state.

One aspect of the present disclosure is to enable a moving direction of another vehicle to be estimated regardless of a communication state, at a driving support device which supports driving of an own vehicle.

A driving support device according to one aspect of the present disclosure includes an other vehicle detecting unit, a lane recognizing unit, a track acquiring unit, an interference determining unit and a driving support unit.

The other vehicle detecting unit is configured to detect a location of another vehicle located around the own vehicle. The lane recognizing unit is configured to recognize a traffic lane in which the other vehicle is located. The track acquiring unit is configured to acquire an own vehicle track indicating a track of the own vehicle in the future.

The interference determining unit is configured to determine whether an other vehicle course indicating a course in a case where another vehicle travels in accordance with a traffic lane interferes with the own vehicle track. The driving support unit is configured to perform driving support different between in an interference state indicating a case where the other vehicle course interferes with the own vehicle track and in a non-interference state indicating a case where the other vehicle course does not interfere with the own vehicle track.

According to such a driving support device, because another vehicle is detected at the own vehicle, and a traffic lane in which the other vehicle is located is recognized, it is possible to estimate a moving direction of the other vehicle regardless of a communication state.

An embodiment of the present disclosure will be described below with reference to the drawings.

1. Embodiment

[1-1. Configuration]

A driving support system 1 is mounted on a vehicle such as, for example, a passenger car. The driving support system 1 determines whether a track of an own vehicle in the future interferes with a track of another vehicle which is a vehicle around the own vehicle, in the future, and performs driving support in the case where the tracks interfere with each other.

Note that the own vehicle means a vehicle on which at least some of components of the driving support system 1 is mounted. Further, the system refers to a configuration in which one or a plurality of devices share and implement target functions. Further, around refers to within an arbitrary range based on the own vehicle, such as, for example, within a range of sight, within a range where communication is possible using radio waves, and within a predetermined distance range.

Figure 1:
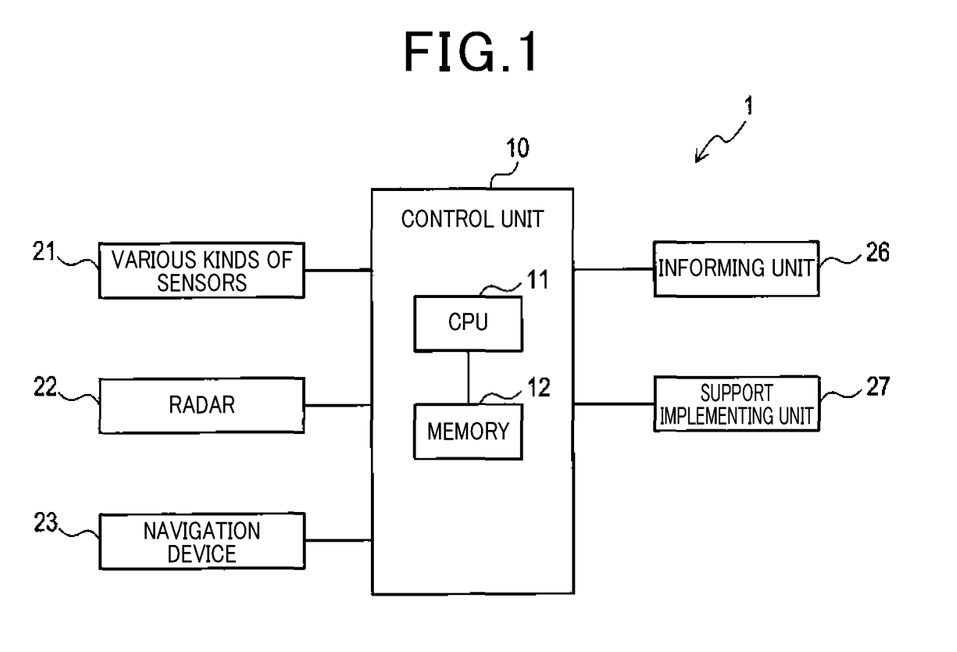
FIG. 1 is a block diagram illustrating a configuration of a driving support system.

As illustrated in FIG. 1, the driving support system 1 includes a control unit 10. The driving support system 1 may include various kinds of sensors 21, a radar 22, a navigation device 23, an informing unit 26 and a support implementing unit 27.

As the various kinds of sensors 21, well-known sensors such as a vehicle speed sensor which detects vehicle speed of the own vehicle, an accelerator position sensor which detects an accelerator position, a steering angle sensor which detects a steering angle, a brake sensor which detects a brake operation amount, and a yaw rate sensor which detects a turning angular velocity, are provided. The various kinds of sensors 21 send detection results of respective values to the control unit 10.

The radar 22 is configured as a well-known radar device which emits electromagnetic waves and detects a location of an object at which the electromagnetic waves are reflected on the basis of reflected waves of these electromagnetic waves. The radar 22 sends information of the location of the object to the control unit 10.

The navigation device 23 includes well-known map data in which latitude and longitude are associated with nodes and links indicating roads, and has a function of detecting a current location of the own vehicle by receiving a signal transmitted from a GPS satellite, a function of guiding the own vehicle to a set destination, or the like. Further, the navigation device 23 also has a function of providing a current location of the own vehicle and map data as necessary in driving support process which will be described later. Note that GPS is an abbreviation for a global positioning system.

The informing unit 26 is configured as a display which displays a display image generated at the control unit 10, a speaker which outputs sound generated at the control unit 10, or the like, for informing a driver of information which urges some kind of attention. The informing unit 26 is used to inform the driver of an evaluation result of driving ability of the driver. Note that the informing unit 26 can employ a well-known configuration.

The support implementing unit 27 supports driving of a vehicle by controlling an accelerator position of the own vehicle, a brake operation amount and a wheel steering angle in accordance with instructions by the control unit 10.

The control unit 10 is mainly configured with well-known microcomputers including a CPU 11 and a semiconductor memory (hereinafter, a memory 12) such as a RAM, a ROM and a flash memory. Various kinds of functions of the control unit 10 are realized by the CPU 11 executing programs stored in a non-transitory tangible recording medium. In the example, the memory 12 corresponds to the non-transitory tangible recording medium in which the programs are stored. Further, by this program executed, a method corresponding to the program is executed. Note that the non-transitory tangible recording medium refers to recording media except an electromagnetic wave. Further, the control unit 10 may be configured with one or a plurality of microcomputers.

The control unit 10 has a function as a driving support process which will be described later and a function as a well-known driving support device, as a configuration of the functions to be implemented by the CPU 11 executing the programs.

Means for realizing these elements constituting the control unit 10 is not limited to software, and part or all of the elements may be realized using one or a plurality of pieces of hardware. For example, in the case where the above-described functions are realized with an electronic circuit which is hardware, the electronic circuit may be realized by a digital circuit including a number of logic circuits, an analog circuit or combination thereof.

[1-2. Process]

Figure 2:
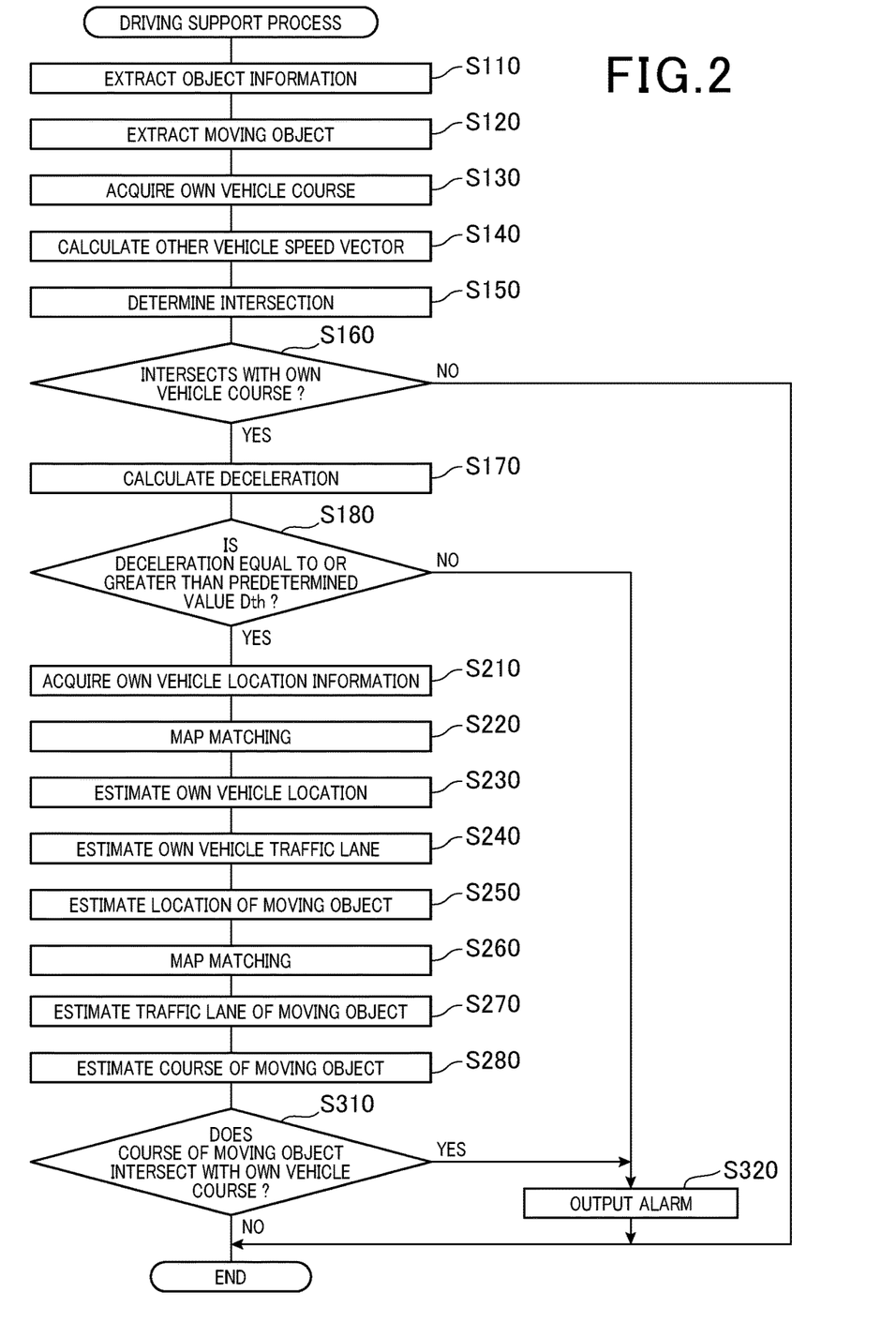
FIG. 2 is a flowchart illustrating driving support process.

The driving support process to be executed by the control unit 10 will be described next using a flowchart in FIG. 2. The driving support process is process of performing driving support when it is expected that the own vehicle collides with another vehicle. Particularly, in the present embodiment, courses of respective vehicles are estimated from traffic lanes of the own vehicle and the other vehicle, and, when the course of the own vehicle interferes with the course of the other vehicle, alarm is given as driving support.

Note that interference means a case where the course of the own vehicle intersects with the course of the other vehicle, or a case where the own vehicle and the other vehicle approach each other to the extent that there is a possibility that the own vehicle and the other vehicle come into contact with each other. Further, the interference state means a state where the courses interfere with each other. Further, the traffic lane means each of regions obtained by segmenting a region where the vehicle can travel with lines, and means a region in which a course where the vehicle may travel is specified for each region.

The driving support process is, for example, process which is repeatedly performed when the control unit 10 is powered on. As illustrated in FIG. 2, in the driving support process, first, object information is detected in S110. Here, the object information includes information regarding locations of objects such as other vehicles existing around the own vehicle. Specifically, the object information means information obtained by the radar 22.

Subsequently, in S120, a moving object is extracted. In this process, information regarding a moving object such as another vehicle is extracted from the object information. For example, whether an object is a moving object or a still object is determined by obtaining relative speed to the object through well-known process and referring to traveling speed of the own vehicle obtained from the various kinds of sensors 21, or the like.

Subsequently, in S130, the course of the own vehicle is acquired. In this process, a current moving vector of the own vehicle is obtained as the course of the own vehicle on the basis of traveling speed, a yaw rate, or the like, of the own vehicle obtained by the various kinds of sensors 21.

Subsequently, in S140, a moving vector of the other vehicle is calculated. In this process, for example, a location of the other vehicle is repeatedly detected assuming that the moving object is the other vehicle, and the moving vector of the other vehicle with respect to a still object is obtained on the basis of the detected location and the course of the own vehicle.

Subsequently, in S150, it is determined whether the course of the own vehicle intersects with the moving vector of the other vehicle in the future. If the course of the own vehicle does not intersect with the moving vector of the other vehicle, the driving support process is finished.

Further, if the course of the own vehicle intersects with the moving vector of the other vehicle, in S170, deceleration of the other vehicle is calculated. In this process, change of speed of the other vehicle is calculated as acceleration by monitoring the location of the other vehicle as time passes. Note that acceleration upon deceleration is set as deceleration.

Subsequently, in S180, the deceleration of the other vehicle is compared with a threshold Dth of deceleration set in advance. The threshold Dth of deceleration is a threshold for determining whether the deceleration of the other vehicle is deceleration at which the vehicle can be decelerated to turning speed indicating speed for a vehicle to safely turn. While the threshold Dth of deceleration may be a fixed value, the threshold Dth may be set greater since the vehicle should be decelerated more strongly as a distance between the other vehicle and the own vehicle becomes shorter.

If the deceleration of the other vehicle is less than the threshold Dth, the process proceeds to S320 which will be described later. Further, if the deceleration of the other vehicle is equal to or greater than the threshold Dth, in S210, own vehicle location information is acquired. The own vehicle location information is information indicating a current location of the own vehicle, and, for example, indicates a location based on a signal obtained from a GPS satellite.

Subsequently, in S220, well-known map matching is performed on the basis of the own vehicle location information, and, in S230, a location based on the map matching is estimated as a location of the own vehicle on map data.

Subsequently, in S240, a track of the own vehicle is estimated. In this process, a lane, particularly, a traffic lane on a road in which the own vehicle is located on the map data, is specified.

Specifically, it is specified whether a traffic lane in which the own vehicle is located is located in a right-turn lane which is a right turn-only traffic lane, is located in a left-turn lane which is a left turn-only traffic lane, is located in a straight-going lane which is a straight going-only traffic lane, or is located in a traffic lane in which straight going and left turn are possible or a traffic lane in which straight going and right turn are possible, or the like.

Note that locations are associated with traffic lanes in advance in the map data. Then, a course in the case where the own vehicle turns right or turns left or goes straight in accordance with the traffic lane is estimated as the track of the own vehicle. In the case where the own vehicle is located in a traffic lane corresponding to a plurality of courses, a plurality of tracks in accordance with the respective courses are estimated.

Subsequently, in S250, a location of a moving object such as another vehicle is estimated. In this process, the location, for example, latitude and longitude of the moving object is estimated on the basis of a relative location of the moving object with respect to the location of the own vehicle.

Subsequently, in S260, map matching is performed on the basis of the location of the moving object. Then, in S250, the location based on the map matching is estimated as a location of the moving object on the map data.

Subsequently, in S270, a lane, particularly, a traffic lane on a road on which the moving object is located on the map data is specified. Specifically, in a similar manner to a case of the own vehicle, it is specified whether the moving object is located in a right-turn lane, is located in a left-turn lane, or is located in a straight-going lane, or the like.

Subsequently, in S280, a track of the moving object is estimated. In this process, in a similar manner to a case of the own vehicle, a course in the case where the moving objet turns right, turns left or goes straight in accordance with the traffic lane is estimated as the track of the moving object.

Subsequently, in S310, it is determined whether the track of the moving object interferes with the track of the own vehicle. Here, it is determined whether the track of the moving object intersects with the track of the own vehicle.

If the track of the moving object interferes with the track of the own vehicle, in S320, the informing unit 26 is caused to output an alarm, and the driving support process is finished. Further, if the track of the moving object does not interfere with the track of the own vehicle, the driving support process is finished without an alarm being output.

Figure 3:
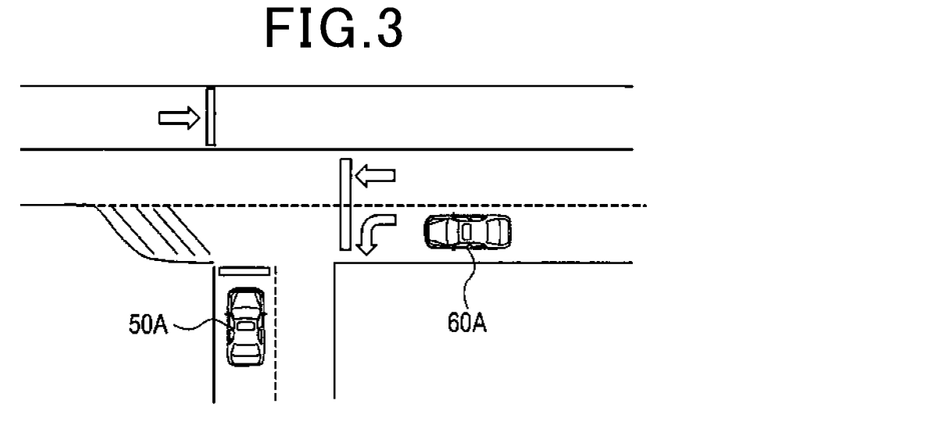
FIG. 3 is a plan view (No. 1) illustrating a state where driving support is suppressed.

As specific examples in which driving support is suppressed, for example, the following situations can be considered. First, as illustrated in FIG. 3, there can be a case where, in a situation where the other vehicle 60A approaches from right ahead of the own vehicle 50A, the other vehicle 60A is located in a left turn-only traffic lane.

In this case, if the other vehicle 60A turns left, there is a high possibility that the track of the other vehicle 60A does not interfere with the track of the own vehicle 50A. Therefore, it is determined that the tracks do not interfere with each other in principle, and driving support is not performed. However, taking into account a case where the other vehicle 60A goes straight without decelerating, deceleration of the other vehicle 60A is monitored in S180 mentioned above, and, in the case where the other vehicle 60A does not decelerate, driving support is performed in S320.

Figure 4:
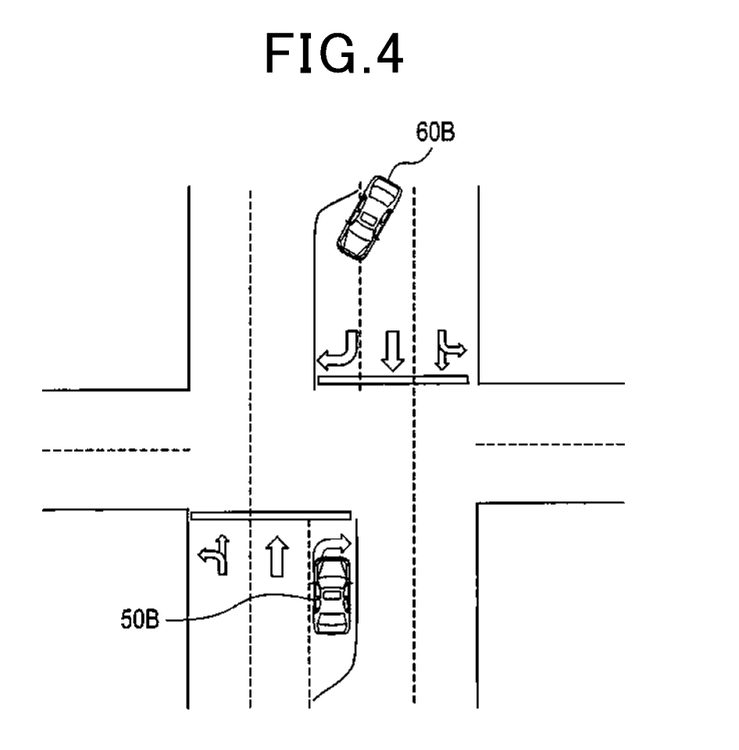
FIG. 4 is a plan view (No. 2) illustrating a state where driving support is suppressed.

In a similar manner, as illustrated in FIG. 4, in the case where the own vehicle 50B is located in a right turn-only traffic lane, and the other vehicle 60B approaches from ahead of the own vehicle 50B and the other vehicle 60B is located in a right turn-only traffic lane, it is determined that the track of the other vehicle 60B does not interfere with the track of the own vehicle 50B.

Figure 5:
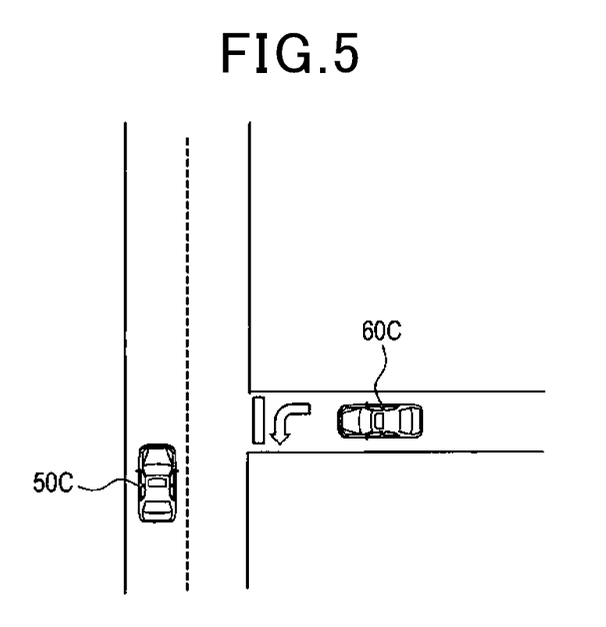
FIG. 5 is a plan view (No. 3) illustrating a state where driving support is suppressed.

Further, as illustrated in FIG. 5, also in the case where the other vehicle 60C emerges to a road on which the own vehicle 50C travels, from a narrow alley from which only left turn is possible, and in a situation where the other vehicle 60C approaches from right ahead of the own vehicle 50C, it is determined that the tracks do not interfere with each other in principle, and driving support is not performed.

In this manner, by setting whether to perform driving support in accordance with whether the tracks of the other vehicles 60A, 60B and 60C interfere with tracks of the own vehicles 50A, 50B and 50C, it is configured so that driving support which is unnecessary for the driver can be omitted.

[1-3. Effects]

According to the embodiment described in detail above, the following effects are exhibited.

(1a) In the above-described driving support system 1, the control unit 10 detects a location of another vehicle existing around the own vehicle, and recognizes a traffic lane in which the other vehicle is located. Further, the control unit 10 acquires an own vehicle track indicating a track of the own vehicle in the future, and determines whether an other vehicle course indicating a course when the other vehicle travels in accordance with the traffic lane interferes with the own vehicle track. The control unit 10 then performs driving support different between in an interference state indicating a case where the other vehicle course interferes with the own vehicle track and in a non-interference state indicating a case where the other vehicle course does not interfere with the own vehicle track.

According to such a driving support system 1, because another vehicle is detected at the own vehicle, and a traffic lane in which the other vehicle is located is recognized, it is possible to estimate a moving direction of the other vehicle regardless of a communication state.

(1b) In the above-described driving support system 1, the control unit 10 detects acceleration of the other vehicle, and determines whether the acceleration of the other vehicle is acceleration at which the other vehicle can be decelerated to turning speed indicating speed set in advance as speed for a vehicle to safely turn. The control unit 10 then performs driving support assuming that the state is the interference state in the case where the other vehicle course interferes with the own vehicle track, or the acceleration of the other vehicle is not acceleration at which the other vehicle can be decelerated, and assuming that the state is the non-interference state in the case where the other vehicle course does not interfere with the own vehicle track, and the acceleration of the other vehicle is acceleration at which the other vehicle can be decelerated.

According to such a driving support system 1, because the other vehicle which ignores the traffic lane is determined by acceleration, it is possible to perform safer driving support.

(1c) In the above-described driving support system 1, the control unit 10 performs driving support in the case where the state is the interference state, and does not perform driving support in the case where the state is the non-interference state.

According to such a driving support system 1, by preventing driving support from being performed in a situation where there is a high possibility that the own vehicle does not come into contact with the other vehicle, it is possible to prevent unnecessary driving support from being performed.

(1d) In the above-described driving support system 1, the control unit 10 issues an alarm to the driver of the own vehicle as driving support.

According to such a driving support system 1, it is possible to inform the driver of danger by an alarm.

(1e) In the above-described driving support system 1, the control unit 10 checks a location of the other vehicle against a location on map data, and recognizes a traffic lane of the other vehicle from a traffic lane specified from the map data.

According to such a driving support system 1, because the traffic lane of the other vehicle is estimated using the map data, it is possible to improve recognition accuracy of the traffic lane in which the other vehicle is located.

(1f) In the above-described driving support system 1, the control unit 10 recognizes whether the other vehicle is located in a left turn-only traffic lane, and, in the case where the other vehicle is located on the right side of the own vehicle, and the other vehicle is located in a left turn-only traffic lane, determines that the other vehicle course does not interfere with the own vehicle track.

According to such a driving support system 1, in a situation where the other vehicle turns left ahead of the own vehicle, it is possible to perform driving support assuming that the other vehicle course does not interfere with the own vehicle track.

(1g) In the above-described driving support system 1, the control unit 10 acquires information indicating that the traffic lane in which the own vehicle is located is a right turn-only traffic lane, and recognizes whether the other vehicle is located in a right turn-only traffic lane. Then, in the case where the own vehicle is located in a right turn-only traffic lane, and the other vehicle approaches from ahead of the own vehicle, and the other vehicle is located in a right turn-only traffic lane, it is determined that the other vehicle course does not interfere with the own vehicle track.

According to such a driving support system 1, it is possible to perform driving support assuming that the other vehicle course does not interfere with the own vehicle track in a situation where the own vehicle and the other vehicle face each other and respectively turn right.

2. Other Embodiments

While the embodiment of the present disclosure has been described above, the present disclosure is not limited to the above-described embodiment, and various modifications can be made.

(2a) While, in the above-described embodiment, the control unit 10 is configured to check the location of the other vehicle against the location on the map data, and recognize a traffic lane of the other vehicle from the traffic lane specified from the map data, the present disclosure is not limited to this. For example, the traffic lane of the road around the own vehicle may be recognized by an arrow, or the like, on the road being recognized with a camera. In this case, the location of the other vehicle may be recognized with a camera, or may be recognized with the radar 22, or the like.

(2b) Further, while, in the above-described embodiment, the control unit 10 is configured to perform driving support in the case of the interference state indicating a case where the other vehicle course interferes with the own vehicle track, and not to perform driving support in the case of the non-interference state indicating a case where the other vehicle course does not interfere with the own vehicle track, the present disclosure is not limited to this. For example, it is also possible to employ a configuration where driving support different in accordance with whether the state is the interference state is performed such that driving support of issuing a strong alarm is performed in the case of the interference state, and driving support of issuing a weak alarm is performed in the case of the non-interference state.

(2c) Further, while, in the above-described embodiment, the control unit 10 is configured to issue an alarm to the driver of the own vehicle, content of the driving support is arbitrary. For example, it is also possible to actuate the brake or suppress acceleration via the support implementing unit 27.

(2d) It is also possible to implement a plurality of functions of one component in the above-described embodiment with a plurality of components or implement one function of one component with a plurality of components. Further, it is also possible to implement a plurality of functions of a plurality of components with one component or implement one function to be implemented by a plurality of components with one component. Further, part of the configuration of the above-described embodiment may be omitted. Still further, at least part of the configuration in the above-described embodiment may be added to or replaced with other configurations in the above-described embodiment. Note that any embodiments embarrassed in technical idea specified from terms recited in the claims falls within embodiments of the present disclosure.

(2e) The present disclosure can be realized in various forms such as, as well as the above-described driving support system 1, an device which becomes a component of the driving support system 1, a program for causing a computer to function as the driving support system 1, a non-transitory tangible recording medium such as a semiconductor memory in which this program is recorded, and a driving support method.

3. Correspondence Relationship Between Configuration of Embodiment and Configuration of Present Disclosure The control unit 10 in the above-described embodiment corresponds to a driving support device in the present disclosure. Further, the process in S110 among the process to be executed by the control unit 10 corresponds to an other vehicle detecting unit in the present disclosure, and the process in S170 in the above-described embodiment corresponds to an acceleration detecting unit in the present disclosure.

Further, the process in S180 in the above-described embodiment corresponds to a deceleration determining unit in the present disclosure, the process in S210, S220, S230 and S240 in the above-described embodiment corresponds to a track acquiring unit in the present disclosure. Still further, the process in S230 in the above-described embodiment corresponds to a lane acquiring unit in the present disclosure, and the process in S250, S260 and S270 in the above-described embodiment corresponds to a lane recognizing unit in the present disclosure.

Further, the process in S280 and S310 in the above-described embodiment corresponds to an interference determining unit in the present disclosure, and the process in S320 in the above-described embodiment corresponds to a driving support unit in the present disclosure.

What is claimed is:

1. A driving support device mounted on an own vehicle and configured to perform driving support of the own vehicle, comprising:
    an other vehicle detecting unit configured to detect a location of an other vehicle existing around the own vehicle;
    a lane recognizing unit configured to check the location of the other vehicle against a location on map data and recognize a traffic lane of the other vehicle from a traffic lane specified from the map data;
    a track acquiring unit configured to acquire an own vehicle track indicating a track of the own vehicle in a future;
    an interference determining unit configured to determine whether an other vehicle course indicating a course when the other vehicle travels in accordance with the traffic lane interferes with the own vehicle track;
    a driving support unit configured to perform driving support different between in an interference state indicating a case where the other vehicle course interferes with the own vehicle track and in a non-interference state indicating a case where the other vehicle course does not interfere with the own vehicle track,
    an acceleration detecting unit configured to detect acceleration of the other vehicle; and
    a deceleration determining unit configured to determine whether the acceleration of the other vehicle is acceleration at which the other vehicle can be decelerated to turning speed indicating speed set in advance as speed for a vehicle to safely turn, when the other vehicle turns in accordance with the other vehicle course,
    wherein the driving support unit performs the driving support assuming that a state is the interference state in a case where the other vehicle course interferes with the own vehicle track, or the acceleration of the other vehicle is not acceleration at which the other vehicle can be decelerated, and assuming that a state is the non-interference state in a case where the other vehicle course does not interfere with the own vehicle track, and the acceleration of the other vehicle is acceleration at which the other vehicle can be decelerated.

2. The driving support device according to claim 1, wherein the driving support unit performs driving support in a case where a state is the interference state and does not perform driving support in a case where a state is the non-interference state.

3. The driving support device according to claim 1, wherein the driving support unit issues an alarm to a driver of the own vehicle as the driving support.

4. The driving support device according to claim 1, wherein the lane recognizing unit recognizes whether the other vehicle is located in a left turn-only traffic lane, and
the interference determining unit determines that the other vehicle course does not interfere with the own vehicle track in a case where the other vehicle is located on a right side of the own vehicle and the other vehicle is located in a left turn-only traffic lane.

5. The driving support device according to claim 1, further comprising:
    a lane acquiring unit configured to acquire information indicating that a traffic lane in which the own vehicle is located is a right turn-only traffic lane,
    wherein the lane recognizing unit recognizes whether the other vehicle is located in a right turn-only traffic lane, and
    the interference determining unit determines that the other vehicle course does not interfere with the own vehicle track in a case where the own vehicle is located in a right turn-only traffic lane, the other vehicle approaches from ahead of the own vehicle, and the other vehicle is located in a right turn-only traffic lane.

* * * * *